United States Patent [19]
Palm

[11] Patent Number: 4,589,308
[45] Date of Patent: * May 20, 1986

[54] SOCKET WRENCH EXTENSION

[76] Inventor: Bernhard Palm, 17420 Continental Dr., Brookfield, Wis. 53005

[*] Notice: The portion of the term of this patent subsequent to Aug. 27, 2002 has been disclaimed.

[21] Appl. No.: 707,737

[22] Filed: Mar. 4, 1985

[51] Int. Cl.$^4$ .................... B25B 23/16; B25G 1/04
[52] U.S. Cl. .................... 81/177.85; 81/177.2; 403/329; 403/361
[58] Field of Search .................... 81/177.2, 177.85; 403/325, 328, 356–358, 361

[56] References Cited

U.S. PATENT DOCUMENTS

| | | | |
|---|---|---|---|
| 3,072,938 | 1/1963 | Phaneuf | 403/329 X |
| 3,306,639 | 2/1967 | Lyon | 81/177.2 X |
| 3,672,708 | 6/1972 | Zemberry | 403/361 X |
| 3,730,571 | 5/1973 | Van Buren | 403/361 |

*Primary Examiner*—James G. Smith
*Attorney, Agent, or Firm*—Bayard H. Michael

[57] ABSTRACT

A push-on/quick release locking arrangement is mounted on a socket wrench extension having a cylindrical body with a square drive end. An inclined transverse bore in the drive end intersects opposed flat faces of the drive end and lock balls are mounted in the bore for movement between a "lock" position and a "release" position. In the "lock" position one ball projects from the end of the bore nearest the end of the drive end to engage a cooperating cavity in the drive recess of a socket. In the "release" position the balls lie within the cross section of the drive end. There is an axial groove in the flat face intersected by the end of said bore further from the end of the drive end. A cylindrical grip sleeve is mounted for slideable movement on the cylindrical body of the extension. The end of said sleeve remote from the drive end is turned inwardly and a cylindrical slider is fixed in the other end of the sleeve. A spring is captured inside the sleeve between the inturned end and the slider. A coil of the spring is captured in a groove in the cylindrical body so the spring bears against the slider to bias the slider and the sleeve towards the drive end and a lock tab projecting from the slider into the axial groove will overlie the lock ball when the inturned end of the sleeve abuts the spring coil. The flat(s) on the sleeve prevent the extension from rolling when laid down.

5 Claims, 7 Drawing Figures

U.S. Patent  May 20, 1986  4,589,308
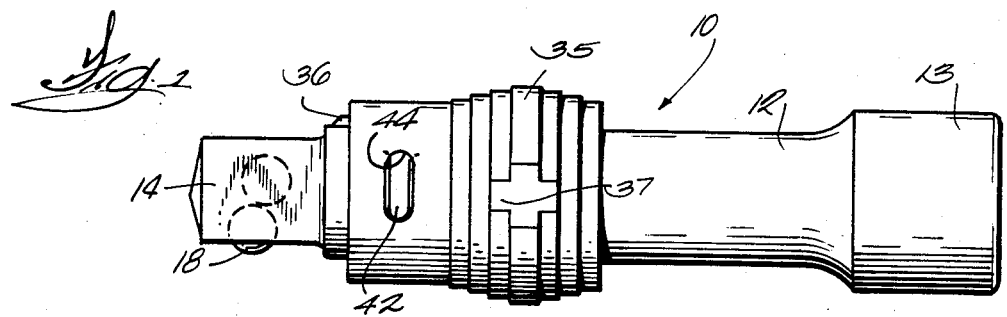
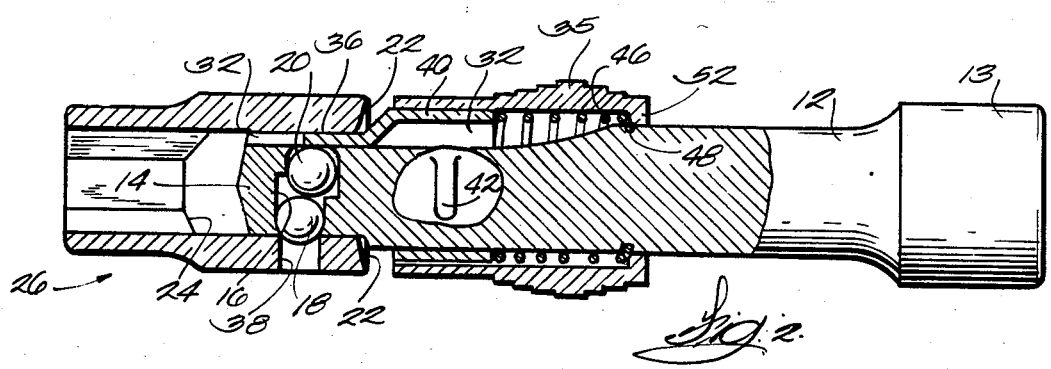
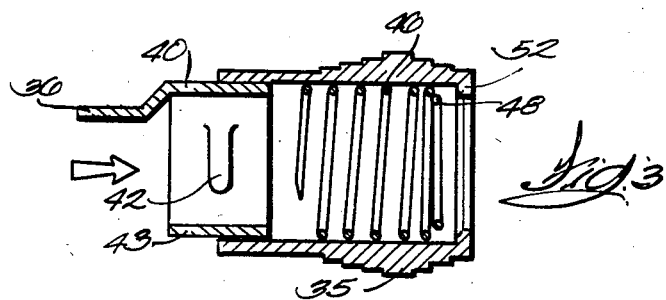
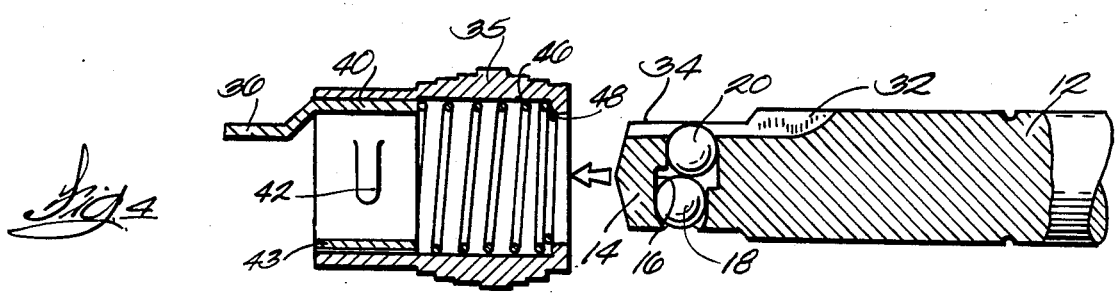
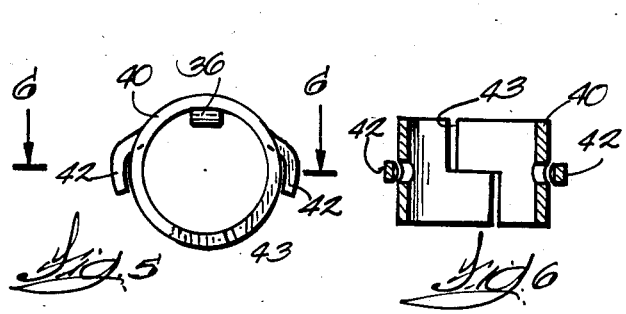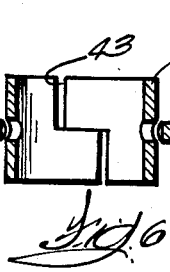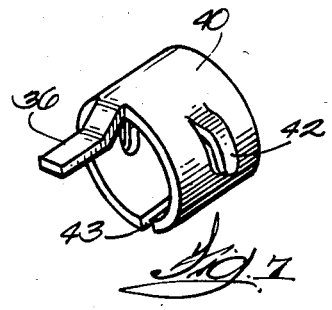

SOCKET WRENCH EXTENSION

BACKGROUND OF THE INVENTION

In my co-pending application Ser. No. 502,763, filed June 9, 1983, I disclosed a quick release locking arrangement for a socket wrench extension. That design required manual actuation of the sleeve to mount a socket on the extension. The design did not have push-on mounting capability. In my application Ser. No. 584,512 filed Feb. 28, 1984 I showed a socket wrench extension with a push-on/quick release locking arrangement. While that design provided a function not heretofore available, the construction called for some costly production operations. Accordingly, this invention is directed to reducing the cost of that design while improving the product by way of making it more rugged.

SUMMARY OF THE INVENTION

This invention provides a push-on/quick release locking arrangement for a socket wrench extension having a cylindrical body with a square drive end. Transverse offset bores or an inclined bore through the drive end intersects opposed flat faces. Lock balls are mounted in the bore for movement between a lock position in which one of the balls projects from one end of the bore far enough to engage a cooperating cavity in the drive recess of a tool and a release position in which the ball lie within the cross section of the drive end. The end of the bore with the projecting ball is closer to the end of the drive end than is the other end of the bore. An axial groove is provided in the flat face intersected by the other end of said bore. A cylindrical sleeve is mounted on the cylindrical body of the extension. The end of the sleeve remote from the drive end is turned inwardly and a cylindrical slider is fixed in the end of the sleeve closer to the drive end. A spring having a coil captured in a groove in the cylindrical body bears against the slider to bias the slider and sleeve towards the drive end, and a lock tab projects from the slider into the axial groove to overlie the ball when said inturned end of said slider abuts said coil.

This invention also provides an anti-roll feature so the extension will not roll away when laid down.

This invention is an improvement over the slider construction shown in my patent application Ser. No. 584,512 in that the lock tab is part of a slider fixed in the "front" end of a sleeve which is turned in at the "rear" end to capture the biasing spring inside the sleeve. The sleeve per se can be roll formed, machined or molded.

BRIEF DESCRIPTION OF THE DRAWINGS

FIG. 1 is an elevation (or plan view) of an extension.

FIG. 2 is a section through an extension engaged with a socket but has the lock between the slider and the sleeve shown in full.

FIG. 3 is a section showing the assembly of the slider in the sleeve.

FIG. 4 is a section showing the assembly of the slider and grip sleeve on the shaft carrying the lock balls.

FIG. 5 is an end view of the slider.

FIG. 6 is a horizontal section on line 6—6 in FIG. 5.

FIG. 7 is a perspective view of the slider.

DETAILED DESCRIPTION OF THE DRAWINGS

The extension 10 has a solid round shaft 12 of the desired length. One end of the extension is provided with a recessed driven member 13 which is connected to and driven by the customary handle or impact wrench. The other end of the extension has a square driver 14 dimensioned to fit one of the standard sizes. Driver 14 has a cross bore 16 in which lock means comprising two balls 18, 20 are mounted. The balls are retained by conventional coining operations at each end of the cross bore to reduce the opening to less than the ball diameter. The cross bore is actually two offset cross bores which accept the balls and position the axis of the balls at an angle to a line perpendicular to the axis of the extension. This positions ball 18 closer to the end of the extension so ball 18 will first engage the side 22 of a recess 24 in a socket 26 as the extension moves into the socket recess. The cross bore can be made by drilling two offset holes (as shown) or one inclined hole to house balls 18, 20. The ball axis is angled in either case.

As viewed in the drawings, an axial groove 32 intersects the cross bore. The groove lies in the middle of the flat drive face 34 and has a depth which when added to the length of the cross bore (measured from the bottom of the groove) is equal to the combined diameters of the two balls 18, 20. This permits the balls to lie wholly between the two opposed drive faces when the slider member and sleeve 35 is moved to position the lock tab 36 in an unobstructing position. When the tab 36 is in the obstructing position shown in FIG. 2 ball 18 further from the tab must project to a lock position beyond the flat face of the driver. When the driver is inserted into the recess of a wrench socket the projecting ball 18 will engage a hole 38 in the recess 24 and the tab 36 will be backed up by the opposite wall of the recess to positively lock the socket to the extension until the lock tab 36 is manually withdrawn. A pin having spherical ends could be used instead of the two balls.

When the extension is inserted into the socket 26, the ball 18 will first strike the sloping entry face 22 of the socket. This is a standard sloping face. The ball has to move into the cross bore for the extension to enter the socket. This results in ball 18 pushing ball 20 upwardly (in the drawing) to deflect the tab 36 upwardly where it will project into the path of entry face 22 of the opposite side of the socket recess. Now then, the tab 36 will in turn push the sleeve 35 to the right and clear the space to allow the ball 20 to move into the groove 32 and hence allow ball 18 to move to a non-obstructing position. When ball 18 overlies hole 38 (which could also be a recess in the wall of the socket) spring 46 will push lock tab 36 to the left to occupy the space between ball 20 and the opposing wall and ball 18 engages hole 38 and the socket is locked on the extension.

The present lock tab projects from split slider 40 fixed inside the sleeve 35. The slider 40 is split opposite the portion from which the tab 36 extends. Preferably this split 43 will be a meandering split shown to minimize passage of dirt into the spring enclosure. The two "sides" of the slider 40 (obviously a cylinder doesn't have sides but if the tab 36 is considered as being at 12 o'clock and the split at 6 o'clock the "sides" at 3 and 9 o'clock are provided with turned out lock tabs 42, 42 which, when brought into registry with cooperating holes 44 in the grip sleeve 35, can engage the holes and lock the slider relative to the sleeve. As the slider is pushed into the sleeve it is squeezed so tabs 42, 42 can enter the sleeve until the tabs can enter holes 44. Then the sides will pop back out to lock the tabs into the sleeve. Before this is done the spring 46 is positioned inside the sleeve as illustrated in FIG. 3 which illustrates the insertion of the slider into the sleeve. Obviously the slider could be withdrawn at this point simply by pulling hard enough to deflect the sides of the split sleeve and pull the slider out. However, the extension end is now inserted (from the spring end of the sleeve) with the balls already in position and retained by coining. Now as the extension moves into position inside the sleeve the far right coil 48 of the spring 46 will snap into the groove 50 in the extension and the sleeve will be limited in its movement to the right relative to the extension by the spring coils going solid. The sleeve can move to the left until the inturned wall 52 of the sleeve engages the spring loop 48 as in FIG. 2. It will be apparent that the extension constitutes a solid back-up to the slider when the parts have been assembled. Thus the slider cannot deflect in to pull the lock tabs 42, 42 out of engagement with the holes 44 in the sleeve. The sleeve assembly is locked onto the extension. It can now be removed only by inserting a small tool and flatening the tabs 42 to clear hole 44.

This arrangement constitutes a great simplification and cost reduction over that of my application Ser. No. 584,512. The grip sleeve now can be a machined part, a roll formed part or can be a molded part. This manner of inserting the slider into the open end of the grip sleeve constitutes a great improvement and cost reduction in addition to providing stronger parts.

The slider can be secured in the grip sleeve in various ways. If the ID of the slider is larger than the body of the extension the sleeve can tilt a little to facilitate pushing the extension into a socket. Instead of the tabs "buttons" can be fixed in a plastic slider to project into holes in the sleeve or the slider can be glued in place, for example.

This improved design retains the same push-on feature of said application. The extension can be pushed onto a socket with a one handed operation. All that is necessary to release a socket is to pull back on the grip sleeve 35 to pull the lock tab away from the ball 20. As a socket on an extension is moved to the work the socket will generally protect against actuating the sleeve in the release direction. As the socket is pulled back engagement of the sleeve with an obstruction will tend to move the slider in the locking direction, not in the release direction. Therefore, the user won't leave the socket behind.

The inturned end 52 of the grip sleeve limits movement of the sleeve to the left when the inturned end 52 engages loop 48 of the spring. The inturned end 52 can be formed by machining, molding, or it can be a ring press forming of the right end of the grip sleeve. The result is the same and the language "inturned end" is meant to embrace all three forms.

This extension embodies a feature not found in the art. The sleeve is provided with 3 circumferentially spaced flats 54 which prevent rolling when the extension is laid down. This avoids the irritating sight (or sound) of the extension rolling away and the problem of relocating it by the user.

I claim:

1. A socket wrench extension having a cylindrical body with a square drive end and provided with a push-on/quick release locking arrangement comprising,
   a transverse bore through said drive end intersecting opposed flat faces,
   lock means mounted in said bore for movement between a lock position in which one end of the lock means projects from one end of the bore and a release position in which the lock means lies within the cross section of the drive end,
   said one end of said bore being closer to the end of said drive end than is the other end of said bore,
   an axial groove in the flat face intersected by said other end of said bore,
   a cylindrical grip sleeve member mounted for slideable movement on said cylindrical body of said extension, said sleeve member having a substantially uniform bore and the end of said sleeve member remote from said drive end being turned inwardly,
   a cylindrical slider member fixed in the end of said sleeve member which is closer to said drive end,
   means axially fixing said slider member in said sleeve member,
   a groove in said cylindrical body,
   a spring having a coil captured in said groove and compressed to bear against said slider member to bias said slider member and sleeve member towards said drive end,
   and a lock tab projecting from said slider member into said groove to overlie said lock means when said inturned end of said sleeve member abuts said coil.

2. The construction of claim 1 in which said slider member and sleeve member loosely fit on the extension to permit slight rocking movement of said sleeve member and slider member about an axis substantially parallel to and transverse said axial groove.

3. The socket wrench extension of claim 1 in which said means axially fixing said slider member in said sleeve member comprises projections on one of said members and means on the other of said members to receive said projections,
   said slider member being axially split to enable the slider member to deflect while being pushed into said grip sleeve member,
   said slider member fitting over said extension when assembled into said grip sleeve member whereby said extension prevents inward deflection of said slider member and the slider member is locked into said grip sleeve member.

4. The extension of claim 1 having at least one flat surface on said sleeve.

5. A socket wrench extension having a cylindrical body with a square drive end and provided with a push-on/quick release locking arrangement comprising,
   a transverse bore through said drive end intersecting opposed flat faces,
   lock means mounted in said bore for movement between a lock position in which one end of the lock means projects from one end of the bore and a release position in which the lock means lies within the cross section of the drive end,
   an axial groove in the flat face intersected by said other end of said bore,
   a cylindrical sleeve mounted for slideable movement on said cylindrical body of said extension, said sleeve having a substantially uniform bore and the end of said sleeve remote from said drive end being turned inwardly,
   a cylindrical slider fixed in the end of said sleeve which is closer to said drive end,
   means axially fixing said slider in said sleeve,
   a groove in said cylindrical body, a spring having a coil captured in said groove and compressed to bear against said slider to bias said sleeve and said slider towards said drive end, and a lock tab projecting from said slider into said groove to overlie said lock means when said inturned end of said sleeve abuts said coil, said lock tab preventing movement of said lock means in said bore when said lock tab overlies said lock means and is prevented from movement transverse said groove, said lock tab being moved out of said groove in response to said one end of said lock means being pushed into said bore, said bore being angled transversely of said drive end so said one end of said lock means is closer to the end of the drive end than is the other end of the lock means.

* * * * *